(12) United States Patent  
Martin et al.

(10) Patent No.: US 12,483,434 B2  
(45) Date of Patent: *Nov. 25, 2025

(54) PROVIDING MEETING CONTROLS FOR NETWORK CONFERENCES

(71) Applicant: Zoom Communications, Inc., San Jose, CA (US)

(72) Inventors: James David Martin, Lakewood, CO (US); Brendan James Ittelson, San Jose, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/664,688

(22) Filed: May 15, 2024

(65) Prior Publication Data

US 2024/0297805 A1    Sep. 5, 2024

Related U.S. Application Data

(63) Continuation of application No. 18/152,805, filed on Jan. 11, 2023, now Pat. No. 12,088,422, which is a continuation of application No. 17/138,654, filed on Dec. 30, 2020, now Pat. No. 11,575,525.

(51) Int. Cl.
    *H04L 12/18*    (2006.01)
    *H04L 9/40*    (2022.01)

(52) U.S. Cl.
    CPC ........ *H04L 12/1818* (2013.01); *H04L 63/102* (2013.01); *H04L 63/20* (2013.01)

(58) Field of Classification Search
    CPC ............ H04L 12/1813; H04L 12/1818; H04L 12/1822; H04L 63/102; H04L 63/20; H04L 65/403; H04L 65/4038; H04L 65/4046

See application file for complete search history.

(56) References Cited

U.S. PATENT DOCUMENTS

| | | |
|---|---|---|
| 5,619,555 A | 4/1997 | Fenton et al. |
| 5,999,208 A | 12/1999 | McNerney et al. |
| 6,567,813 B1 | 5/2003 | Zhu et al. |
| 6,573,926 B1 | 6/2003 | Ichimura |
| 6,901,448 B2 | 5/2005 | Zhu et al. |
| 7,016,935 B2 | 3/2006 | Lee et al. |
| 7,035,899 B2 | 4/2006 | Marchon et al. |
| 7,346,654 B1 | 3/2008 | Weiss |
| 7,636,750 B2 | 12/2009 | Haldar |
| 7,679,638 B2 | 3/2010 | Eshkoli et al. |
| 7,679,640 B2 | 3/2010 | Eshkoli et al. |
| 7,707,249 B2 | 4/2010 | Spataro et al. |
| 8,042,148 B2 | 10/2011 | Andreasen et al. |

(Continued)

OTHER PUBLICATIONS

Cisco, User Guide for Cisco Webex Meetings Server Release 4.0, May 13, 2020, pp. 1-90 (Year: 2020).

(Continued)

*Primary Examiner* — Jeong S Park
(74) *Attorney, Agent, or Firm* — Young Basile Hanlon & MacFarlane, P.C.

(57) ABSTRACT

Meeting controls are provided for network conferences. Providing meeting controls includes maintaining a policy database and receiving a request to participate in a conference. The request includes an identifier. The meeting controls are transmitted to a user device based on the request.

20 Claims, 11 Drawing Sheets

(56) References Cited

U.S. PATENT DOCUMENTS

| | | |
|---|---|---|
| 8,060,366 B1 | 11/2011 | Maganti et al. |
| 8,081,205 B2 | 12/2011 | Baird et al. |
| 8,264,520 B2 | 9/2012 | Oya |
| 8,300,790 B2 | 10/2012 | Buford et al. |
| 8,479,239 B2 | 7/2013 | Kelly |
| 8,520,822 B2 | 8/2013 | Gisby et al. |
| 8,564,637 B2 | 10/2013 | Wu |
| 8,593,502 B2 | 11/2013 | Saleh et al. |
| 8,626,847 B2 | 1/2014 | Jones et al. |
| 8,654,954 B2 | 2/2014 | Gaudin et al. |
| 8,681,203 B1 | 3/2014 | Yin et al. |
| 8,775,511 B2 | 7/2014 | Vernon et al. |
| 8,803,942 B2 | 8/2014 | Wang et al. |
| 8,813,196 B2 | 8/2014 | Weller et al. |
| 8,856,530 B2 | 10/2014 | Patti et al. |
| 8,868,051 B2 | 10/2014 | Baccay et al. |
| 8,909,701 B2 | 12/2014 | Costa-Requena et al. |
| 8,990,329 B1 | 3/2015 | Khvostichenko et al. |
| 8,997,222 B2 | 3/2015 | Meliksetian et al. |
| 9,020,472 B2 | 4/2015 | Scriven et al. |
| 9,087,521 B2 | 7/2015 | Reynolds |
| 9,118,734 B2 | 8/2015 | Kaminsky et al. |
| 9,253,613 B2 | 2/2016 | Rhee et al. |
| 9,544,542 B2 | 1/2017 | Sakurai |
| 9,560,413 B2 | 1/2017 | Gonzalez |
| 9,614,977 B1 | 4/2017 | Bond et al. |
| 9,635,061 B2 | 4/2017 | McCormack et al. |
| 9,936,164 B2 | 4/2018 | Liu et al. |
| 9,973,551 B2 | 5/2018 | Ouyang et al. |
| 10,021,348 B1 | 7/2018 | Imai et al. |
| 10,033,726 B2 | 7/2018 | Arai |
| 10,038,730 B2 | 7/2018 | Sawhney et al. |
| 10,129,303 B2 | 11/2018 | Morita et al. |
| 10,129,313 B2 | 11/2018 | Ouyang et al. |
| 10,152,190 B2 | 12/2018 | Jones et al. |
| 10,241,736 B2 | 3/2019 | Miki |
| 10,250,402 B2 | 4/2019 | Matsushita |
| 10,264,217 B2 | 4/2019 | Pepperell et al. |
| 10,268,360 B2 | 4/2019 | Jones et al. |
| 10,284,609 B2 | 5/2019 | Malatesha et al. |
| 10,382,501 B2 | 8/2019 | Malatesha et al. |
| 10,397,183 B2 | 8/2019 | Ravindranath et al. |
| 10,447,795 B2 | 10/2019 | Digilov et al. |
| 10,628,800 B2 | 4/2020 | Moran |
| 10,645,129 B2 | 5/2020 | Aggarwal et al. |
| 10,666,661 B2 | 5/2020 | Zhang |
| 10,673,912 B2 | 6/2020 | Houchen et al. |
| 10,687,021 B2 | 6/2020 | Ma et al. |
| 10,708,315 B1 | 7/2020 | Pallapa et al. |
| 10,721,534 B2 | 7/2020 | Thilagarajah |
| 10,742,655 B2 | 8/2020 | Taylor et al. |
| 10,757,366 B1 | 8/2020 | Kwatra et al. |
| 10,965,725 B1 | 3/2021 | Rosenberg et al. |
| 11,121,885 B2 * | 9/2021 | Waugh .................. H04L 67/306 |
| 11,146,601 B1 | 10/2021 | Silverstein et al. |
| 11,575,525 B2 * | 2/2023 | Martin .................. H04L 63/20 |
| 11,588,657 B2 | 2/2023 | Rolin et al. |
| 11,595,451 B2 | 2/2023 | Martin et al. |
| 11,876,846 B2 | 1/2024 | Martin et al. |
| 12,088,422 B2 * | 9/2024 | Martin .................. H04L 63/20 |
| 2005/0132048 A1 | 6/2005 | Kogan et al. |
| 2005/0198021 A1 | 9/2005 | Wilcox et al. |
| 2005/0273510 A1 | 12/2005 | Schuh |
| 2006/0066717 A1 | 3/2006 | Miceli |
| 2007/0019645 A1 | 1/2007 | Menon |
| 2008/0126953 A1 * | 5/2008 | Davidson ............... G06Q 10/10 715/753 |
| 2008/0159490 A1 | 7/2008 | Gaudin et al. |
| 2008/0297586 A1 | 12/2008 | Kurtz et al. |
| 2009/0040948 A1 | 2/2009 | Wengrovitz et al. |
| 2009/0083183 A1 | 3/2009 | Rao et al. |
| 2009/0220064 A1 | 9/2009 | Gorti et al. |
| 2011/0023096 A1 | 1/2011 | Xiao et al. |
| 2012/0102201 A1 | 4/2012 | Nakagawa et al. |
| 2012/0163577 A1 | 6/2012 | Buford et al. |
| 2012/0304078 A1 | 11/2012 | Ramaswamy et al. |
| 2013/0336170 A1 | 12/2013 | Broadworth et al. |
| 2013/0347053 A1 | 12/2013 | Motoyama |
| 2014/0118472 A1 | 5/2014 | Liu et al. |
| 2015/0215580 A1 * | 7/2015 | Leske ................. H04L 12/1822 348/14.08 |
| 2016/0072963 A1 * | 3/2016 | Cai ..................... H04L 12/1407 370/259 |
| 2016/0277384 A1 | 9/2016 | Arai |
| 2016/0295167 A1 | 10/2016 | Sakurai |
| 2016/0323330 A1 | 11/2016 | Holst et al. |
| 2016/0352788 A1 | 12/2016 | Sawhney et al. |
| 2016/0379171 A1 | 12/2016 | Gatzke et al. |
| 2017/0039527 A1 | 2/2017 | Rangan |
| 2017/0124518 A1 * | 5/2017 | Leske ................. G06Q 10/1095 |
| 2017/0303102 A1 | 10/2017 | Dong et al. |
| 2018/0007097 A1 | 1/2018 | Malatesha et al. |
| 2018/0007098 A1 * | 1/2018 | Malatesha ............. H04L 65/403 |
| 2018/0103074 A1 | 4/2018 | Rosenberg |
| 2018/0124237 A1 | 5/2018 | Broadworth |
| 2018/0124577 A1 | 5/2018 | Yang et al. |
| 2020/0014736 A1 * | 1/2020 | Takesue ............... H04L 65/4015 |
| 2020/0295959 A1 | 9/2020 | Fukasawa |
| 2020/0412778 A1 | 12/2020 | Araki |
| 2021/0203486 A1 | 7/2021 | Kilburn |
| 2022/0209976 A1 | 6/2022 | Martin et al. |
| 2022/0210207 A1 | 6/2022 | Martin et al. |
| 2023/0120583 A1 | 4/2023 | Martin et al. |
| 2023/0171119 A1 | 6/2023 | Martin et al. |
| 2024/0106878 A1 | 3/2024 | Martin et al. |

OTHER PUBLICATIONS

Cisco Webex, WebEx Meeting Center User Guide For Hosts, Presenters, and Participants, Aug. 25, 2014, pp. 1-157 (Year: 2014).

\* cited by examiner

| | | |
|---|---|---|
| ACCOUNT 1 | | USER CTL |
| | 1. SCREEN SHARE | ENABLED |
| | 2. CHAT | ENABLED |
| | 3. RECORD | ENABLED |
| GROUP 1 | | |
| | 1. SCREEN SHARE | ENABLED |
| | 2. CHAT | DISABLED |
| | 3. RECORD | ENABLED |
| GROUP 2 | | |
| | 1. SCREEN SHARE | ENABLED |
| | 2. CHAT | ENABLED |
| | 3. RECORD | DISABLED |
| ⋮ | | |
| GROUP N | | |
| USER 1 | | |
| | 1. SCREEN SHARE | DISABLED |
| | 2. CHAT | ENABLED |
| | 3. RECORD | ENABLED |
| USER 2 | | |
| | 1. SCREEN SHARE | DISABLED |
| | 2. CHAT | ENABLED |
| | 3. RECORD | DISABLED |
| ⋮ | | |
| USER N | | |
| ACCOUNT 2 | | |
| | 1. SCREEN SHARE | ENABLED |
| | 2. CHAT | ENABLED |
| | 3. RECORD | ENABLED |

FIG. 5

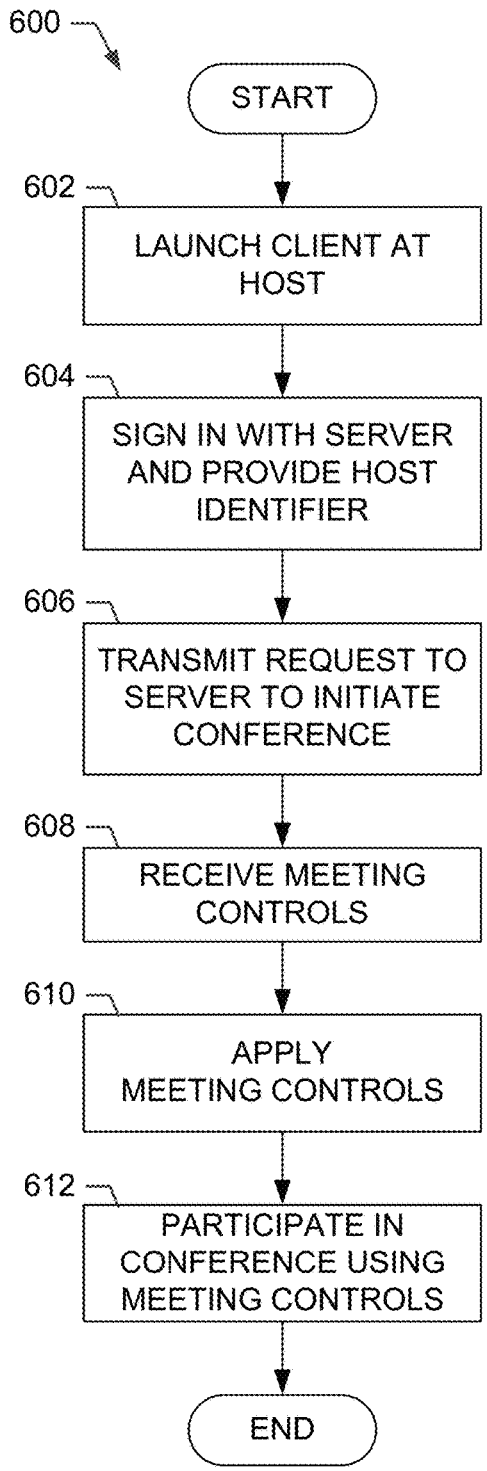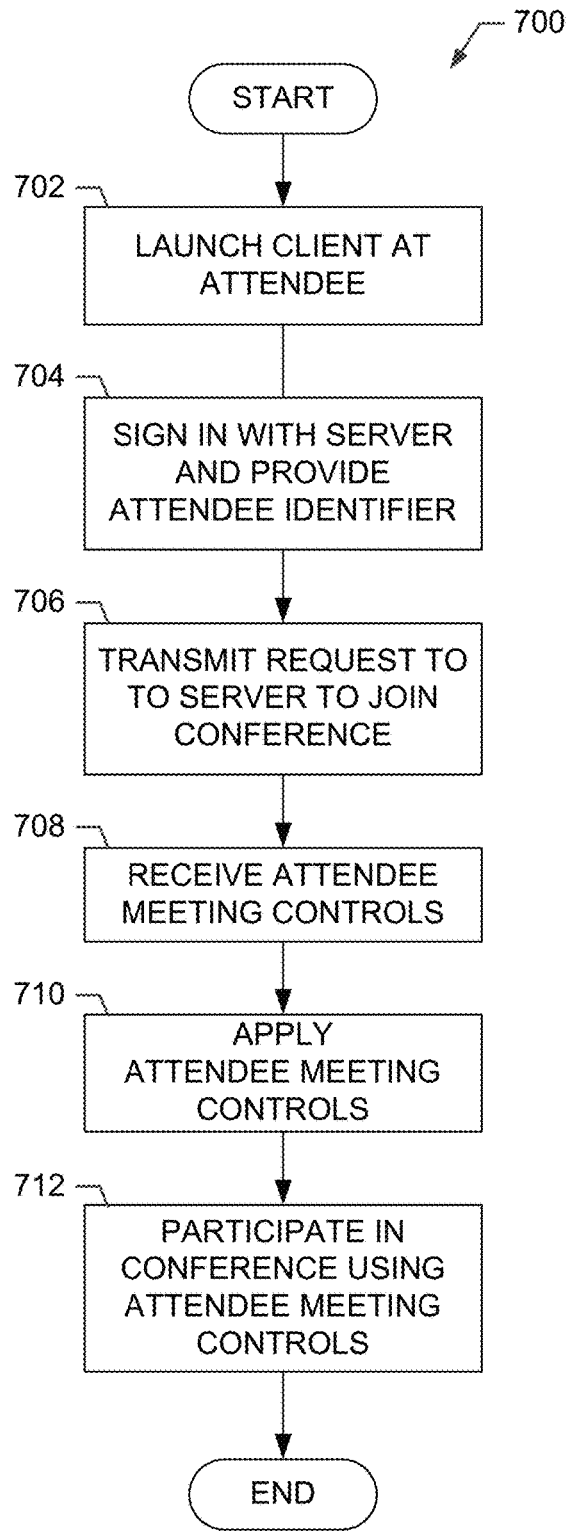
FIG. 6
FIG. 7

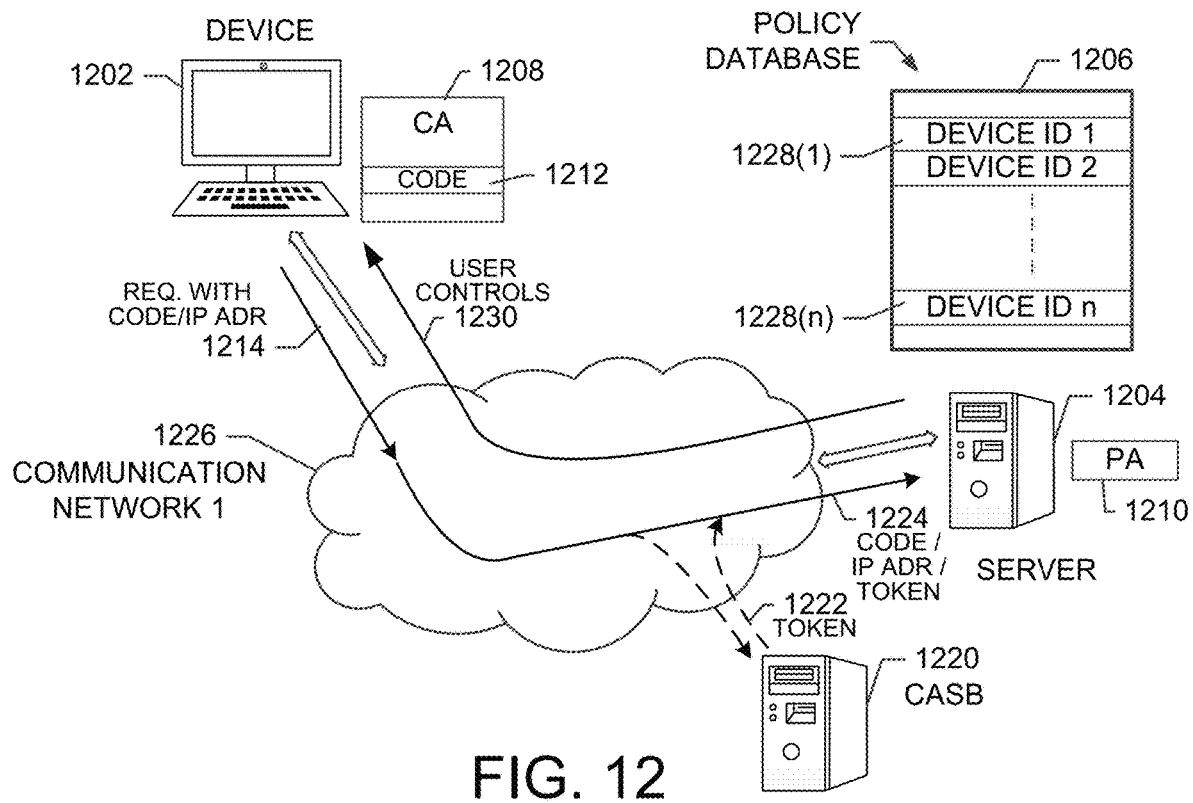

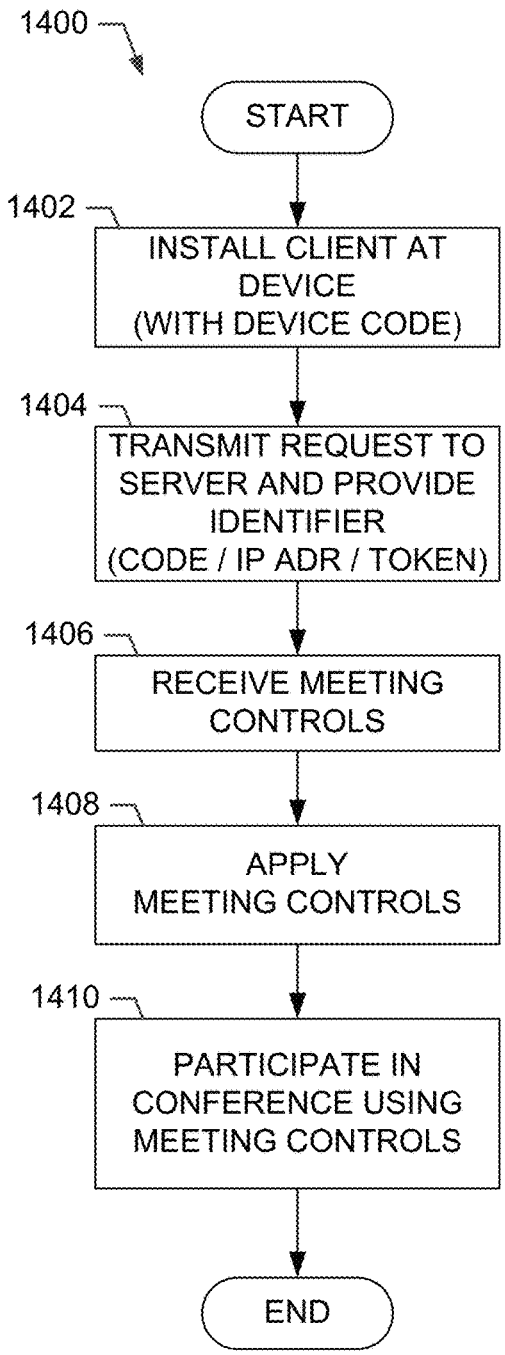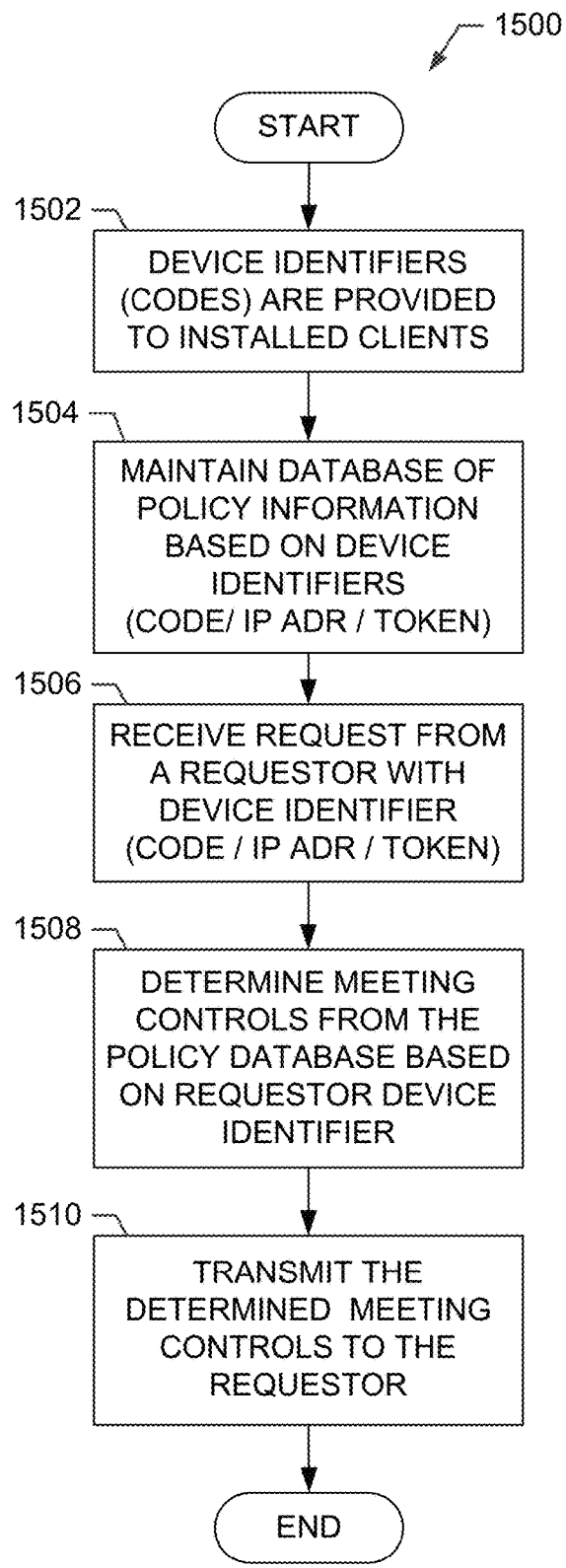
FIG. 14
FIG. 15

PROVIDING MEETING CONTROLS FOR NETWORK CONFERENCES

CROSS REFERENCE TO RELATED APPLICATION(S)

This application is a continuation of U.S. patent application Ser. No. 18/152,805, filed Jan. 11, 2023, which is a continuation of U.S. patent application Ser. No. 17/138,654, filed Dec. 30, 2020, the entire disclosures of which are hereby incorporated by reference.

FIELD

The exemplary embodiments of the present invention relate to the field of network communication. More specifically, the exemplary embodiments of the present invention relate to the generation, distribution and receipt of meeting controls for network conferences.

BACKGROUND

With the increasing popularity of digital electronics and network communications, real-time interactive network conferences (or meetings) have become more popular. For example, network conferencing now allows people to communicate with each other from remote locations to exchange audio and video in real time.

Typically, a meeting host determines meeting controls that are utilized by every meeting participant. For example, the meeting controls enable or disable functions, such as screen sharing or recording functions, which may be performed during a meeting. It may be desirable to restrict the functions that meeting participants can perform to assure meeting security or privacy. Unfortunately, under certain circumstances host-directed meeting controls may be bypassed or avoided. It is therefore desirable to have a mechanism to provide meeting controls that overcomes the problems associated with conventional techniques.

SUMMARY

In various embodiments, methods and apparatus provide meeting controls to participants for use during network conferences. In an embodiment, a conference system server maintains a policy database that identifies policy rules (also referred to as "meeting controls") to be applied to registered users, user groups, and conferencing accounts. Unlike conventional systems, the disclosed embodiments provide meeting controls that follow users rather than the host of a network conference. In an embodiment, a user's client application queries a conferencing server that determines meeting control decisions based upon different web configurations encoded in a policy database. The determined meeting controls are then downloaded for implementation by the client application. As a result, different rule sets can be applied at the user level when joining internal or external meetings. In another embodiment, a device identifier, such as a device code, IP address, or token are received at a server and used to determine meeting controls for the device.

In an embodiment, a method is provided that comprises maintaining a policy database and receiving a request from a requestor to participate in a network conference. The request includes an identifier. The method also includes determining meeting controls from the policy database based on the identifier, and transmitting the meeting controls to the requestor for use during the network conference.

In an embodiment, an apparatus for providing user meeting controls is disclosed. The apparatus comprising a policy database, and a processor configured to receive a request from a requestor to participate in a network conference. The request includes an identifier. The processor is also configured to determine meeting controls from the policy database based on the identifier, and transmit the meeting controls to the requestor for use during the network conference.

In an embodiment, a non-transitory computer readable medium is provided on which are stored program instructions that, when executed by one or more processors, cause the one or more processors to perform operations of: maintaining a policy database; receiving a request from a requestor to participate in a network conference, wherein the request includes an identifier; determining meeting controls from the policy database based on the identifier; and transmitting the meeting controls to the requestor for use during the network conference.

In an aspect, a method may include maintaining a policy database including accounts. Each account may have first meeting controls and second meeting controls. The method may include receiving a request from a user device to join a conference. The request may include a first identifier associated with a first account type. The method may include comparing the first identifier to a second identifier associated with a second account type. The method may include transmitting, based on the request, the first meeting controls to the user device when the conference is a first conference type. The method may include transmitting, based on the request, the second meeting controls to the user device when the conference is a second conference type.

In an aspect, an apparatus may include a policy database and a processor. The policy database may include accounts. Each account may have first meeting controls and second meeting controls. The processor may be configured to receive a request from a user device to join a conference. The request may include a first identifier associated with a first account type. The processor may be configured to compare the first identifier to a second identifier associated with a second account type to determine a conference type. The processor may be configured to transmit, based on the request, the first meeting controls to the user device when the conference is a first conference type. The processor may be configured to transmit, based on the request, the second meeting controls to the user device when the conference is a second conference type.

In an aspect, a non-transitory computer-readable medium may include stored instructions that, when executed by a processor, cause the processor to perform operations comprising maintaining a policy database that includes accounts. Each account may have first meeting controls and second meeting controls. The operations may include receiving a request from a user device to join a conference. The request may include a first identifier associated with a first account type. The operations may include comparing the first identifier to a second identifier associated with a second account type to determine a conference type. The operations may include transmitting, based on the request, the first meeting controls to the user device when the conference is a first conference type. The operations may include transmitting, based on the request, the second meeting controls to the user device when the conference is a second conference type.

In one or more aspects, the method may be performed at a server. In one or more aspects, the first identifier may be an IP address. In one or more aspects, the first identifier may be one of a user identifier and a device identifier. In one or more aspects, maintaining the policy database includes associating a plurality of identifiers with a plurality of meeting controls, respectively. One or more aspects may include determining a matching identifier from the plurality of identifiers that matches the first identifier. One or more aspects may include retrieving selected meeting controls associated with the matching identifier. One or more aspects may include assigning the selected meeting controls as the meeting controls. One or more aspects may include a policy database that includes sections. One or more aspects may include a policy database that includes account, group, and user sections. One or more aspects may include searching the user section, then the group section, and then the account section of the policy database to determine the conference meeting controls. One or more aspects may include searching the user section of the policy database to determine the conference meeting controls. One or more aspects may include searching the group section of the policy database to determine the conference meeting controls. One or more aspects may include searching the user section of the policy database to determine the conference meeting controls. One or more aspects may include determining that the user device has not signed in. One or more aspects may include determining host meeting controls associated with a host of the conference. One or more aspects may include setting the conference meeting controls to the host meeting controls.

Additional features and benefits of the exemplary embodiments of the present invention will become apparent from the detailed description, figures and claims set forth below.

BRIEF DESCRIPTION OF THE DRAWINGS

The exemplary embodiments of the present invention will be understood more fully from the detailed description given below and from the accompanying drawings of various embodiments of the invention, which, however, should not be taken to limit the invention to the specific embodiments, but are for explanation and understanding only.

FIG. 5 shows an exemplary embodiment of a policy database.

FIG. 6 shows an exemplary method for operating a host device to obtain meeting controls from a server for use during a network conference.

FIG. 7 shows an exemplary method for operating an attendee device to obtain meeting controls from a server for use during a network conference.

FIG. 12 shows another exemplary embodiment of a communication network that illustrates how meeting controls are provided to conference participants in accordance with embodiments of the invention.

FIG. 13 shows a diagram illustrating an exemplary embodiment of a policy database.

FIG. 14 shows an exemplary method for operating a device to obtain meeting controls from a server for use during a network conference.

FIG. 15 shows an exemplary method for operating a server to provide network conference meeting controls to a requesting device.

DETAILED DESCRIPTION

Figure 1:
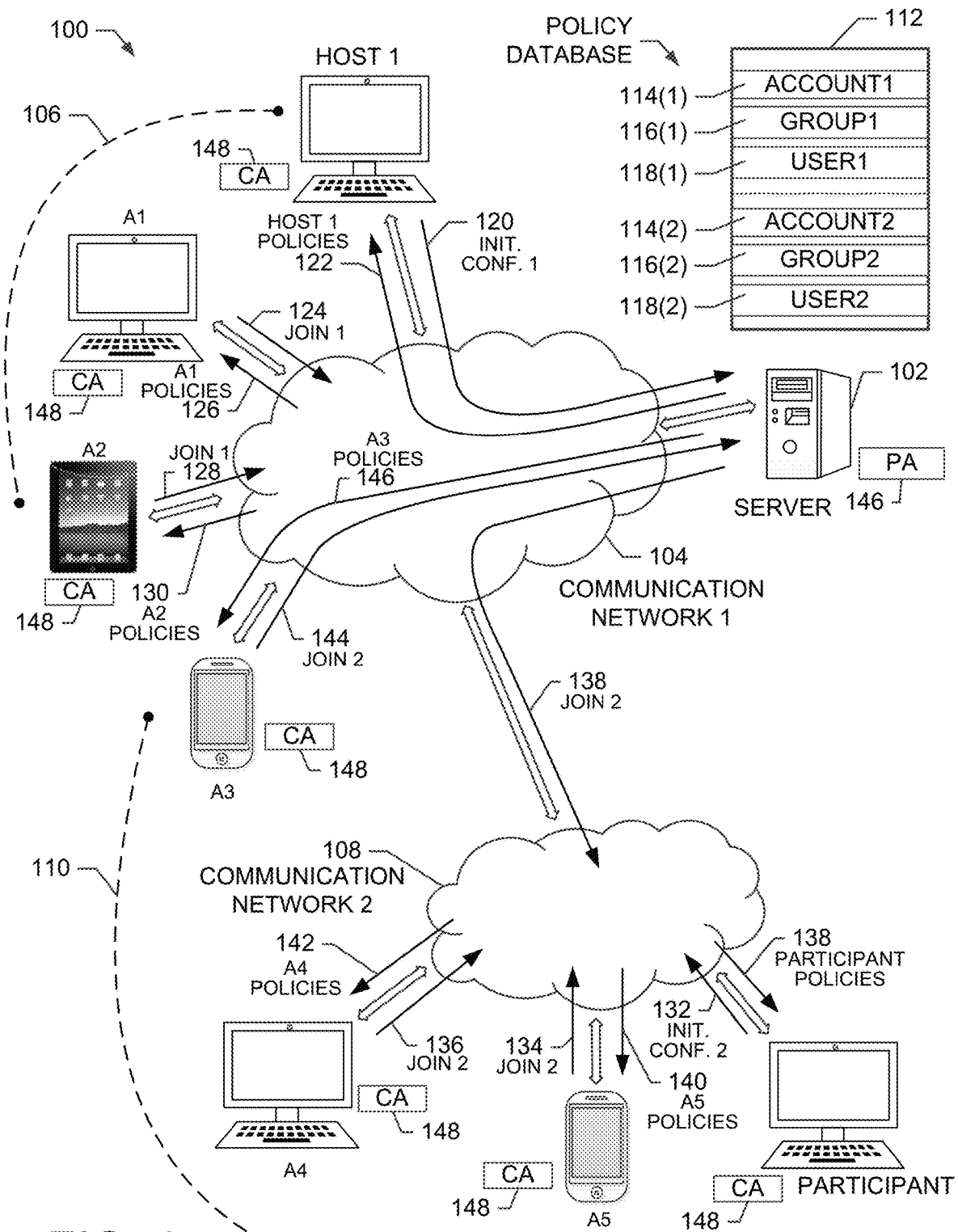
FIG. 1 shows an exemplary embodiment of a communication network that illustrates how meeting controls are provided to conference participants in accordance with embodiments of the invention.

Embodiments of the present invention disclose systems, methods, and apparatus for providing meeting controls to participants for use during network conferences.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application and business related constraints, and that these specific goals will vary from one implementation to another and from one developer to another. Moreover, it will be understood that such a development effort might be complex and time-consuming but would nevertheless be a routine undertaking of engineering for those of ordinary skills in the art having the benefit of embodiments of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

In accordance with the embodiments of the present invention, the components, process steps, and/or data structures described herein may be implemented using various types of operating systems, computing platforms, computer programs, and/or general-purpose machines. In addition, those of ordinary skills in the art will recognize that devices of a less general-purpose nature, such as hardware devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine, those process steps can be stored as a series of instructions readable by the machine or computer for execution. The instructions may be stored on a tangible medium such as, but not limited to, magnetoresistive random access memory ("MRAM"), phase-change memory, or ferroelectric RAM ("FeRAM"), flash memory, ROM (Read Only Memory), PROM (Programmable Read Only Memory), EEPROM (Electrically Erasable Programmable Read Only Memory), Jump Drive, magnetic storage medium (e.g., tape, magnetic disk drive, and the like), optical storage medium (e.g., CD-ROM, DVD-ROM, paper card and paper tape, and the like) and other known types of program memory.

The term "system" or "device" is used generically herein to describe any number of components, elements, subsystems, devices, packet switch elements, packet switches, access switches, routers, networks, computer and/or communication devices or mechanisms, or combinations of components thereof. The term "computer" includes a processor, memory, and buses capable of executing instructions and refers to one or a cluster of computers, personal computers, workstations, mainframes, or combinations of computing devices thereof.

FIG. 1 shows an exemplary embodiment of a communication network 100 that illustrates how meeting controls are provided to conference participants in accordance with embodiments of the invention. The communication network 100 comprises a server 102 that communicates with a communication network 104 to facilitate network conferences between conference participants. In an embodiment, the communication network 104 comprises a wired communication network, a wireless communication network, or a combination of wired and wireless communication networks.

In an embodiment, the server 102 comprises a policy database 112 that provides meeting controls for use by participants during a network conference. The policy database 112 includes account meeting controls 114, group meeting controls 116, and user meeting controls 118 for a plurality of accounts. In an embodiment, the meeting controls control the ability for meeting participants to perform a variety of functions, such as record a conference, conduct chats, or perform screen sharing during a conference. Virtually any functions performed by a participant during a conference can be controlled by the meeting controls. The meeting controls can therefore provide network security and privacy and can be implemented using a single policy database.

To implement a first network conference 106, a host apparatus (HOST 1) that is a member of Account 1, transmits a request over the network 104 to the server 102 to initiate the first network conference 106. For example, HOST 1 includes an installed client application (CA) 148 that transmits the request. The request includes information identifying the host user (e.g., user identifier). In response to the request 120, the server 102 accesses the Account 1 114(1), Group 1 116(1), and User 1 118(1) sections of the policy database 112 based on the user identifier to determine meeting controls that will be applied to the HOST 1 during the network conference 106. For example, the server 102 includes policy application (PA) 146 that receives and processes the request to determine the meeting controls. The server 102 then transmits the determined meeting controls (or host policies) 122 to the HOST 1 apparatus. It should be noted that the client application (CA) 148 is installed on a variety of devices shown in FIG. 1 and all those devices can interact with the server 102.

A first attendee apparatus (A1) that is also a member of Account 1, desires to join the conference 106 and transmits a request to join 124 to the server 102. The request to join 124 includes information identifying the first attendee (A1) (e.g., user identifier). In response to the request 124, the server 102 accesses the Account 1/Group 1/User 1 sections of the policy database 112 based on the user identifier to determine the meeting controls to be used by the attendee apparatus (A1). The server 102 then transmits the determined meeting controls (or A1 policies) 126 to the attendee apparatus (A1).

A second attendee apparatus (A2) that is also a member of Account 1, desires to join the conference 106 and transmits a request to join 128 to the server 102. The request to join 128 includes information identifying the second attendee (A2) (e.g., user identifier). In response to the request 128, the server 102 accesses the Account 1/Group 1/User 1 sections of the policy database 112 based on the user identifier to determine the meeting controls to be used by the attendee apparatus (A2). The server 102 then transmits the determined meeting controls (or A2 policies) 120 to the attendee apparatus (A2). Thus, the server 102 is able to determine the meeting controls that are implemented at each apparatus that is participating in the first network conference 106.

To start a second network conference 110, a (PARTICIPANT) apparatus that is a member of Account 2, transmits a request 132 over the networks 108 and 104 to the server 102 to initiate the second network conference 110. The request includes information identifying the PARTICIPANT user (e.g., user identifier). In response to the request 120, the server 102 accesses the Account 2/Group 2/User 2 sections of the policy database 112 based on the user identifier to determine meeting controls that will apply to the PARTICIPANT user during the second network conference 110. The server 102 then transmits the determined meeting controls (or policies) 138 to the PARTICIPANT apparatus. The users of attendee apparatuses (A4) and (A5) are also members of Account 2 and desire to join the second network conference 110. These devices transmit join requests 136 and 134 to the server 102 and these requests include corresponding user identifiers. In response to the requests 134 and 136, the server 102 accesses the Account 2/Group 2/User 2 sections of the policy database 112 based on the user identifiers to determine meeting controls that will apply to the attendees A4 and A5 during the second network conference 110. The server 102 then transmits the determined meeting controls (or policies) 142 and 140 to the attendees A4 and A5, respectively.

In an embodiment, the attendee (A3) that is a member of Account 1, desires to join the second network conference 110 and transmits a join request 144 over the network 104 to the server 102 to join the second network conference 110. The request 144 includes a user identifier. The server accesses the Account 1/Group 1/User 1 sections of the policy database 112 based on the user identifier to determine the policies to be implemented by the attendee (A3) while participating in the second network conference 110. The server 102 then transmits the determined meeting controls 146 to the attendee (A3). Thus, even though the attendee (A3) is joining the second conference 110 that is hosted by PARTICIPANT, which is a member of Account 2, the server 102 determines the policies for attendee (A3) from the Account 1 sections of the policy database 112. Thus, no matter what conference attendee (A3) joins, the policy rules for (A3) are determined from the Account 1 sections of the policy database 112. This prevents an attendee from bypassing the assigned policy rules for that attendee when participating in external conferences.

Figure 2:
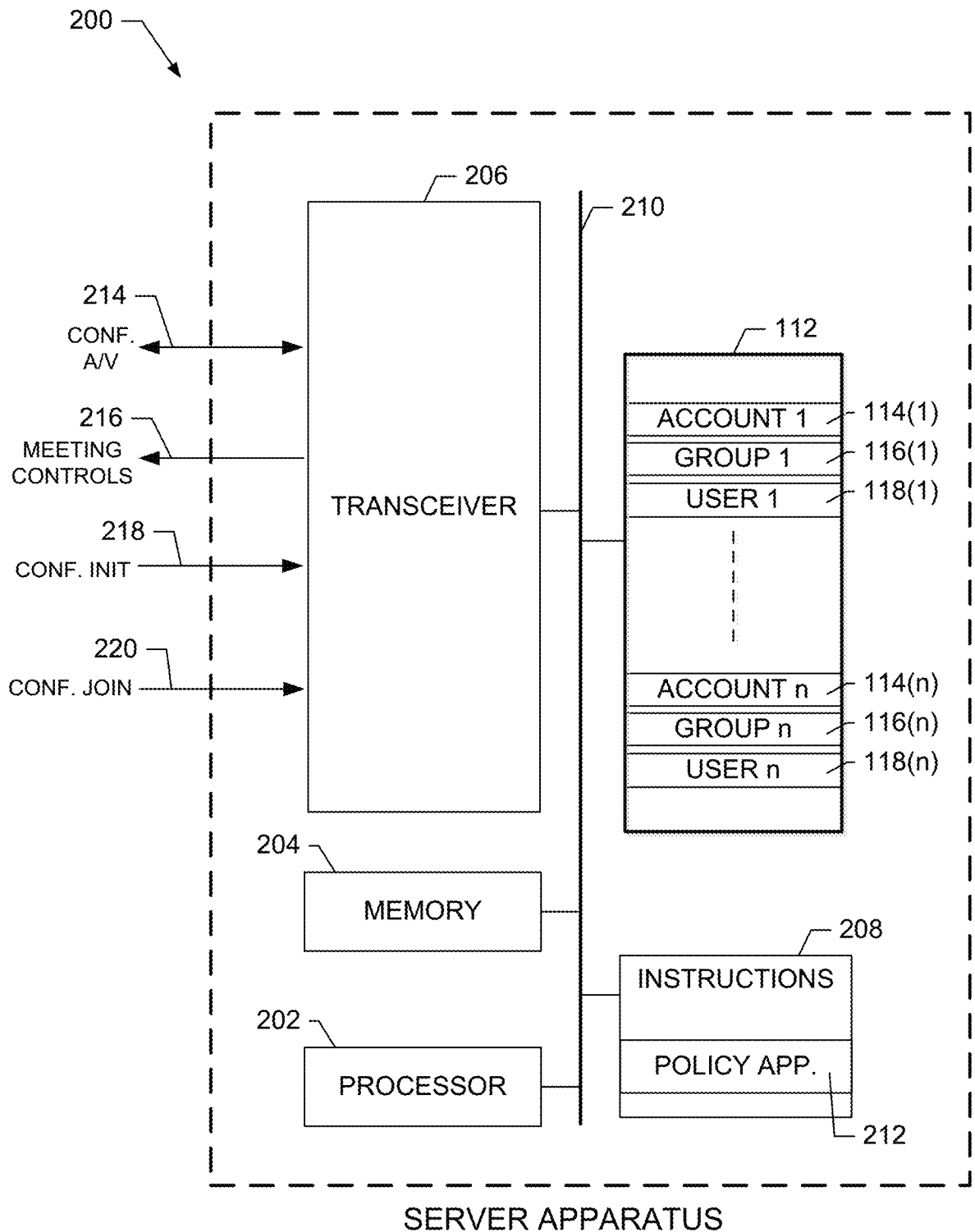
FIG. 2 shows an exemplary server apparatus configured to provide meeting controls during network conferences.

FIG. 2 shows an exemplary server apparatus 200 configured to provide meeting controls during network conferences. For example, the server apparatus 200 is suitable for use as the server 102 shown in FIG. 1. In an embodiment, the server 200 comprises processor 202, memory 204, transceiver 206, instructions 208, and the policy database 112, all couple to communicate over bus 210. The policy database 112 comprises policy information organized into a plurality of accounts starting with the Account 1 114(1), group 1 116(1), and user 1 118(1) and extending to Account n 114(n), group n 116(n), and user n 118(n). The policy information (also referred to as "meeting controls," "rules," or "policy rules") controls the features and functionality that a device can perform during a network conference. During operation, the processor 202 executes instructions 208 and utilizes the memory 204 as necessary to perform the functions of the server 200 as described herein. For example, the processor 202 executes a policy application 212 to identify meeting controls from the policy database 112 to be transmitted and utilized by an identified conference participant. The policy application 212 is suitable for use as the PA 146 shown in FIG. 1.

During a network conference, the processor 202 executes the instructions 208 and the policy application 212 to control the transceiver 206 to communicate with the network 102 to exchange information with the conference participants. For example, the transceiver 206 receives conference initiation requests 218 from host devices and passes this information to the processor 202. The transceiver 206 also receives conference join requests 220 from attendees that desire to join a particular network conference and passes this information to the processor 202. The transceiver 206 also transmits meeting controls 216 determined by the processor 202 that control the features and functionality of conference participants. Once a conference is established, the processor 202 controls the transceiver 206 to receive and transmits conference audio and video (A/V) information 214 as well as other parameters between conference participants.

In exemplary embodiments, when a conference initiation request 218 or a conference join request 220 is received and passed to the processor 202, the processor executes the policy application 212 to determine meeting controls to be applied to the user/device making the request. Once the meeting controls are determined, they are transmitted to the requesting device. For Desktop/Mobile devices, the end user must be signed in for the web based policy settings to take effect. In an embodiment, the settings can be controlled through, for instance, a window installer (.msi), a macOS properties file (.plist), or a mobile application configuration instruction (appconfig push). Once signed in, the client is subsequently identified by its username and/or account ID.

Joining Conferences on a Different Account

Within the account 114 and group 116 sections is an option to determine policy information when a registered user wishes to join a conference hosted on a difference account.

From the account/group sections of the policy database 112, the processor 202 can determine meeting controls to be applied when a user on one account joins a conference hosted on a different account. When joining a meeting hosted by another account, the attendee client application will query the account ID of the user hosting the meeting to generate a join/external conference request that is transmitted to the server. The attendee then applies the meeting controls received in response to the join/external conference request, thereby securing the attendee and ensuring compliance with meeting controls assigned to the attendee even while participating in the external conference.

Bring Your Own Device (BYOD)

The end user of a BYOD, such as a mobile phone, must be signed in for the web-based policy settings to take effect. This may not be controlled in the first instance, however, once signed in, the client can pull the respective configuration policy to the device as it is now authenticated to the web. When hosting/joining a meeting, the BYOD client will behave the same as Desktop/Mobile devices.

Figure 3:
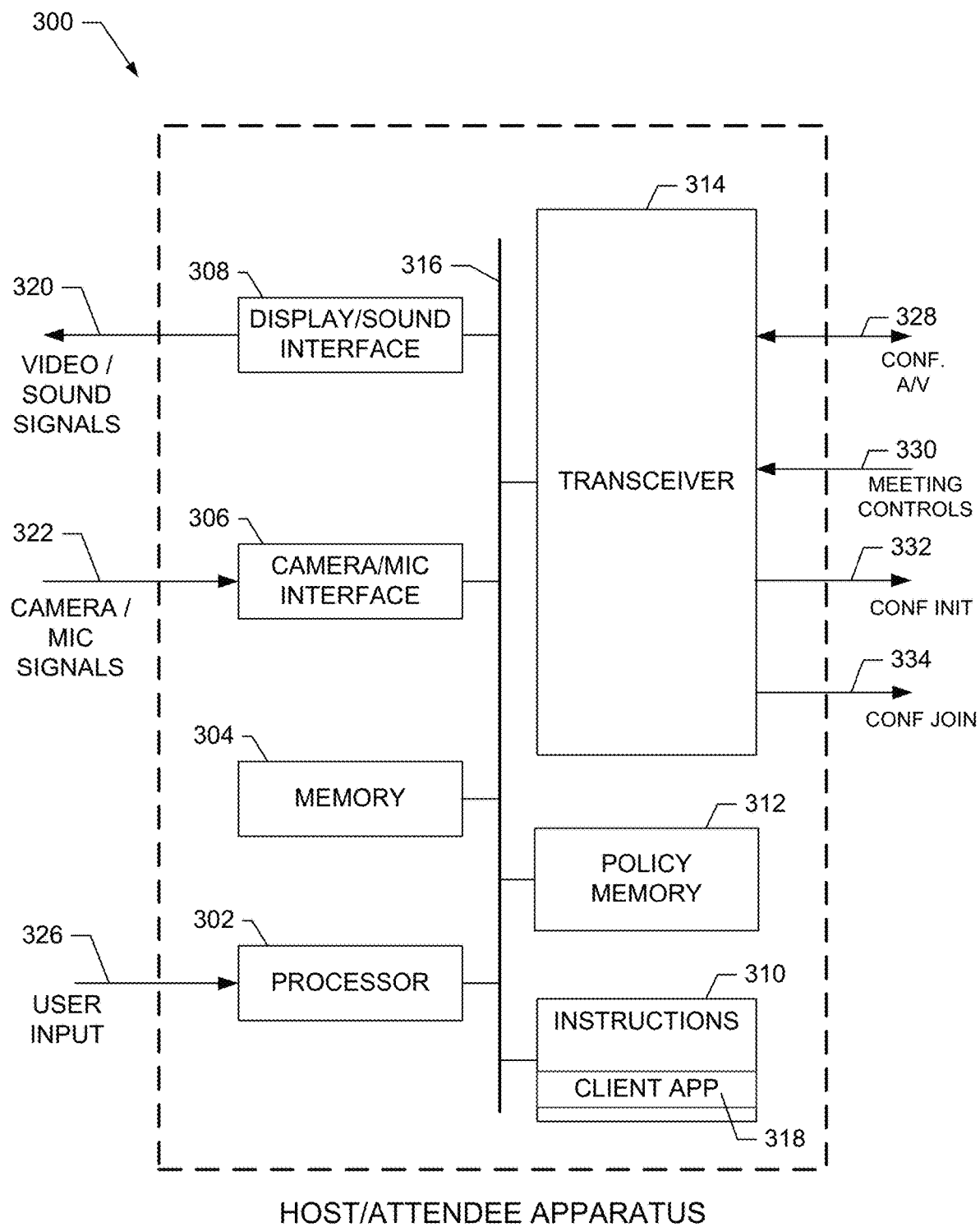
FIG. 3 shows an exemplary host/attendee apparatus configured to obtain meeting controls for use during network conferences.

FIG. 3 shows an exemplary host/attendee apparatus 300 configured to obtain meeting controls for use during network conferences. For example, the host/attendee apparatus 300 is suitable for use as the HOST 1, PARTICIPANT, and the attendees (A1-A5) devices shown in FIG. 1. The host/attendee apparatus 300 comprises processor 302, memory 304, camera/microphone interface 306, display/sound interface 308, instructions 310, policy memory 312, and transceiver 314 all connected to communicate over data bus 316. In an embodiment, the instructions 310 comprise a client application 318. The client application 212 is suitable for use as the CA 148 shown in FIG. 1.

During operation, the processor 302 executes the instructions 310 and the client application 318 to perform the functions and operations described herein. For example, the processor 302 controls the camera/microphone interface 306 to receive a camera/mic signal 322 from a camera and a microphone mounted at the apparatus. The camera signal contains an image of the apparatus user. The microphone captures audio and voice at the user's location. The display/sound interface 308 is configured to output a video/sound signal 320 to a video display and sound speaker that is part of the apparatus 300. The processor 302 also receives user input 322, such as keyboard or mouse inputs, and uses this input to perform various functions of the apparatus 300.

During a network conference, the processor 302 executes the client application 318 and controls the transceiver 314 to communicate using the networks 104, 108 to exchange information with the server 102 and other conference participants. For example, the transceiver 314 transmits conference initiation requests 332 to the server 102 to initiate a network conference. The transceiver 314 also transmits conference join requests 334 to the server 102 join a particular network conference. The transmitted request includes a user/device identifier that identifies the user/apparatus 300. The transceiver 314 also receives meeting controls 330 determined by the server 102 that controls the features and functionality of apparatus 300 during a network conference. The received meeting controls are stored in the policy memory 312 and are used by the processor 302 to implement meeting controls at the apparatus 300. Once a conference is established, the processor 302 controls the transceiver 314 to exchange conference audio and video (A/V) information 328 as well as other parameters with conference participants while implementing the received meeting controls.

Figure 4:
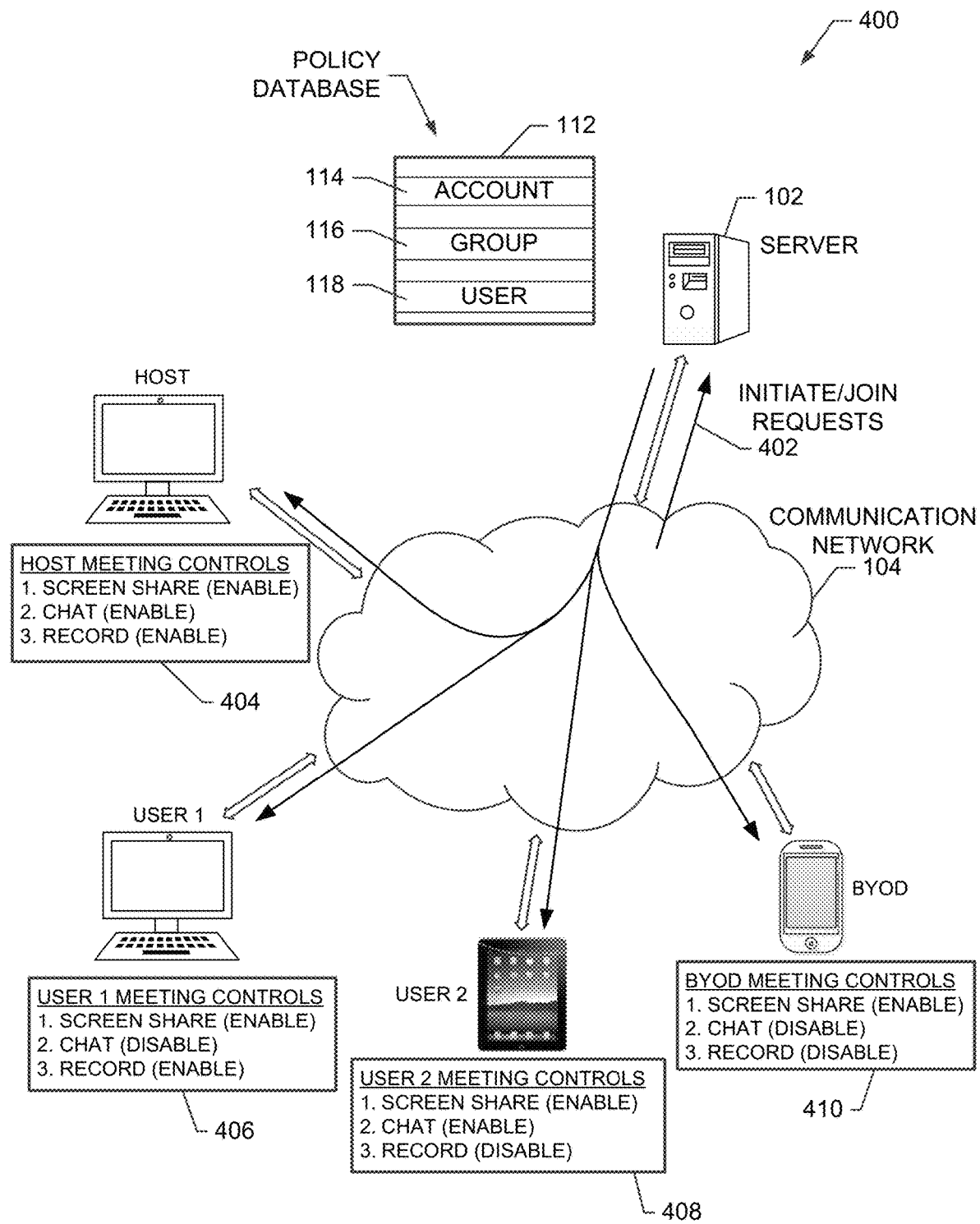
FIG. 4 shows a diagram illustrating how meeting controls are provided by a server for use by conference participants during a network conference.

FIG. 4 shows a diagram illustrating how meeting controls are provided by a server for use by conference participants during a network conference. The server 102 includes a policy database 112 that identifies one or more accounts 114 each having groups 116 and users 118. During operation, the server 102 receives initiate or join requests 402 from registered users that desire to host (initiate) or join a network conference. Each request includes an identifier that identifies the user/device making the request.

As each request is received, the server 102 accesses the policy database 112 based on the received user/device identifier to determine the meeting controls to be utilized by the requesting user during the conference. Each requesting user may have a different set of meeting controls from other users, or the meeting controls may be the same for all users in a particular account or group. Once the meeting controls are determined, they are transmitted from the server 102 to the requesting user. For example, the HOST receives meeting controls 404, the USER 1 receives meeting controls 406, the USER 2 receives meeting controls 408, and the BYOD (mobile device) receives meeting controls 410.

FIG. 5 shows a diagram illustrating an exemplary embodiment of a policy database 500. For example, the policy database 500 is suitable for use as the policy database 112 shown in FIG. 1. In an embodiment, the policy database 500 comprises a plurality of accounts. For example, a first account comprises Account 1 meeting controls 502, group meeting 504, and user meeting 506. The group 504 and user 506 meeting controls are for users registered under Account 1. For example, the account/group/user meeting controls enable and disable functions for screen share, chat, and recording during a network conference. Each account includes one or more groups and each group has its own meeting controls. User meeting controls are also defined for individual users. In another embodiment, a device section is included in the database 500 that defines meeting controls based on device identifier. The database 500 can also define any number of additional accounts having their own group and user meeting controls. For example, Account 2 508 is also shown and can include meeting controls for identified groups and users.

FIG. 6 shows an exemplary method 600 for operating a host device to obtain meeting controls from a server for use during a network conference. For example, in an embodiment, the method 600 is performed by the client application 318 running on the HOST 1 apparatus shown in FIG. 1.

At block 602, a user launches a client application to host a network conference. For example, the user of the HOST 1 launches the client application 318 to host the network conference 106. In an embodiment, the processor 302 receives user input 326 and in response, executes the client application 318 to perform this operation.

At block 604, the HOST 1 device signs in with a server 102 and provides a user/host identifier. For example, the processor 302 performs a sign-in with the server 102 as indicated at 332.

At block 606, the host device transmits a request to the server to host (or initiate) a conference. The request includes information identifying the HOST 1 user/device. For example, the HOST 1 transmits the request 120 to host (or initiate) the network conference 106. In an embodiment, the processor 302 controls the transceiver 314 to transmit the request 332 to initiate the network conference 106.

At block 608, in response to the request to initiate the conference, the server determines host meeting controls based on the host identifier and transmits these meeting controls (host policies) 122 back to the host device. For example, the meeting controls 330 are received from the server 102 by the transceiver 314 and stored in the policy memory 312.

At block 610, the host meeting controls are applied at the host device. For example, the processor 302 retrieves the meeting controls from the memory 312 and applies these meeting controls during the network conference 106 to control the operation of the host device.

At block 612, the host participates in the conference using the received meeting controls. For example, the HOST 1 device participates in the conference 106 under the control of the received meeting controls.

Thus, the method 600 provides a method for operating a host device to obtain meeting controls from a server for use during a network conference. It should be noted that the operations of the method 600 are exemplary and not limiting of the scope of the embodiments. Furthermore the operations of the method 600 can be changed, deleted, rearranged, added to, or otherwise modified within the scope of the embodiments.

FIG. 7 shows an exemplary method 700 for operating an attendee device to obtain meeting controls from a server for use during a network conference. For example, in an embodiment, the method 700 is performed by the client application 318 running on the attendee apparatus A1 shown in FIG. 1.

At block 702, a user launches a client application to join a network conference. For example, the user of the attendee A1 launches the client application 318 to join the network conference 106. In an embodiment, the processor 302 executes the client application 318 to perform this operation.

At block 704, the attendee A1 signs in with a server 102 and provides an attendee user/device identifier. For example, the processor 302 performs a sign-in with the server 102 as indicated at 332.

At block 706, the attendee device transmits a request to the server to join a conference. The request includes the attendee/device identifier identifying the attendee A1 and a conference 106 identifier. For example, the attendee A1 transmits the request 124 to join the network conference 106. In an embodiment, the processor 302 controls the transceiver 314 to transmit the request 334 to join the network conference 106.

At block 708, in response to the request to join the conference, the server determines meeting controls based on the attendee user/device identifier and transmits these meeting controls 126 back to the attendee A1. For example, the meeting controls 330 are received from the server 102 by the transceiver 314 and stored in the policy memory 312.

At block 710, the meeting controls are applied at the attendee device. For example, the processor 302 retrieves the meeting controls from the memory 312 and applies these meeting controls during the network conference 106 to control the operation of the attendee A1.

At block 712, the attendee participates in the conference with the received meeting controls in place. For example, the attendee A1 participates in the conference 106 under the control of the received meeting controls.

Thus, the method 700 provides a method for operating an attendee device to obtain meeting controls from a server for use during a network conference. It should be noted that the operations of the method 700 are exemplary and not limiting of the scope of the embodiments. Furthermore the operations of the method 700 can be changed, deleted, rearranged, added to, or otherwise modified within the scope of the embodiments.

Figure 8:
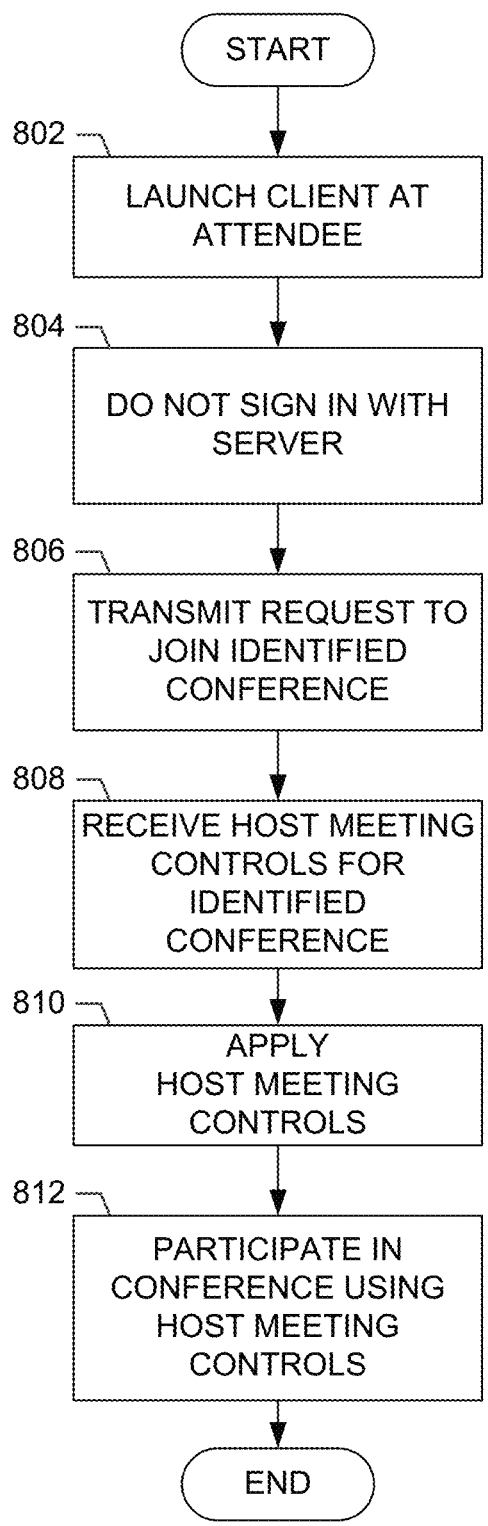
FIG. 8 shows an exemplary method for operating an attendee device that is not signed-in to obtain meeting controls from a server for use during a network conference.

FIG. 8 shows an exemplary method 800 for operating an attendee device that is not signed-in to obtain meeting controls from a server for use during a network conference. For example, in an embodiment, the method 800 is performed by the client application 318 running on an attendee apparatus.

At block 802, a user launches a client application to join a network conference. For example, the user launches the client application 318 to join the network conference 106. In an embodiment, the processor 302 executes the client application 318 to perform this operation.

At block 804, the attendee does not sign in with the server 102.

At block 806, the attendee device transmits a request to the server to join a conference. The request includes information identifying the conference 106. For example, the processor 302 controls the transceiver 314 to transmit a request to join a conference 334 that includes a conference identifier.

At block 808, in response to the request to join the conference, the server determines host meeting controls for the identified conference. For example, the processor 202 accesses the policy database 112 to determine the meeting controls assigned to the host of the identified conference. The processor 202 then controls the transceiver 206 to transmit the host meeting controls 216 to the requesting attendee. The host meeting controls are received at the attendee apparatus from the server and stored in the policy memory 312.

At block 810, the host meeting controls are applied at the attendee device. For example, the processor 302 obtains the host meeting controls from the policy memory 312 and applies these meeting controls during the conference.

At block 812, the attendee participates in the conference with the received host meeting controls in place.

Thus, the method 800 provides a method for operating an attendee device that has not signed-in to obtain host meeting controls from a server for use during a network conference. It should be noted that the operations of the method 800 are exemplary and not limiting of the scope of the embodiments. Furthermore the operations of the method 800 can be changed, deleted, rearranged, added to, or otherwise modified within the scope of the embodiments.

Figure 9:
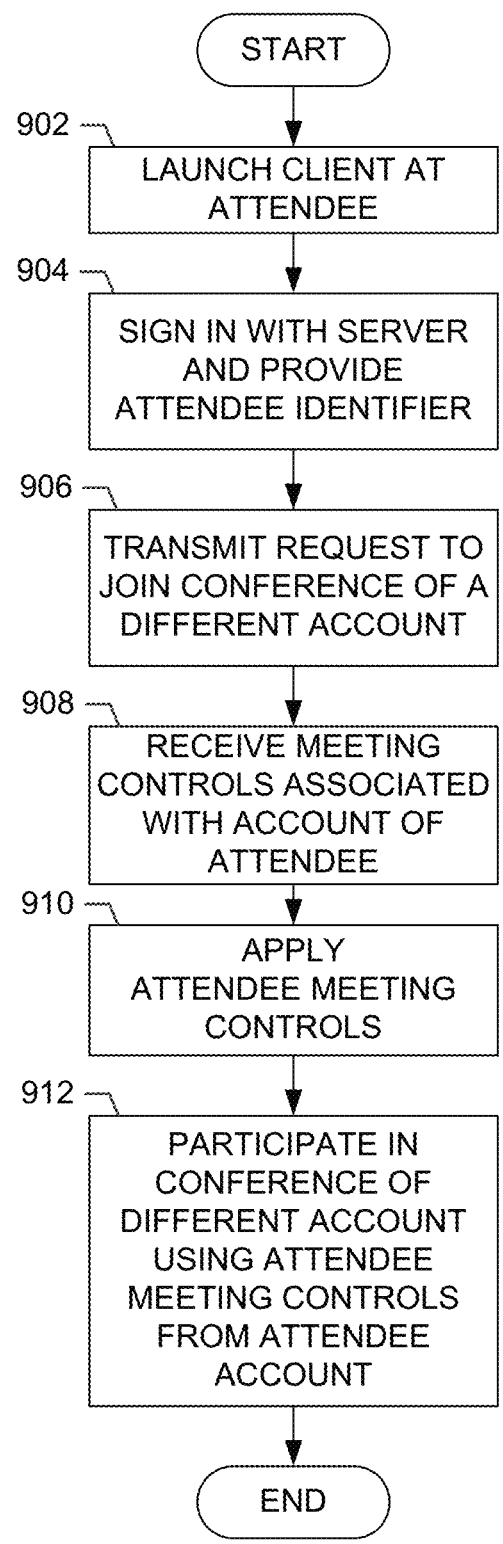
FIG. 9 shows an exemplary method for operating an attendee device to obtain meeting controls from a server for use during a network conference on a different account.

FIG. 9 shows an exemplary method 900 for operating an attendee device to obtain meeting controls from a server for use during a network conference on a different account (external conference). For example, in an embodiment, the method 900 is performed by the client application 318 running on the attendee apparatus A3 shown in FIG. 1.

At block 902, a user launches a client application to join a network conference. For example, the user of the attendee A3 launches the client application 318. In an embodiment, the processor 302 executes the client application 318 to perform this operation.

At block 904, the attendee A3 signs in with a server 102 and provides an attendee identifier.

At block 906, the attendee device transmits a request to the server to join a conference on a different account. For example, the attendee A3 requests to join the conference 110 hosted by PARTICIPANT on account 2. The request includes information identifying the attendee A3 and the conference 110 identifier. For example, the attendee A3 transmits the request 144 to join the network conference 110. In an embodiment, the processor 302 controls the transceiver 314 to transmit the request 334 to join the network conference 110.

At block 908, in response to the request to join the conference, the server determines attendee meeting controls based on the attendee identifier under the account to which the attendee belongs. For example, the attendee A3 belongs to account 1, and so the server determines the meeting controls for attendee A3 from the account 1 sections of the policy database 112. The server 102 transmits these attendee meeting controls (or policies) 146 back to the attendee A3 where they are stored in the memory 312.

At block 910, the attendee meeting controls are applied at the attendee device. For example, the processor 302 retrieves the attendee meeting controls from the memory 312 and applies these meeting controls during the network conference 110 to control the operation of the attendee A3 during the network conference 110.

At block 912, the attendee participates in the conference 110 with the received meeting controls in place. For example, the attendee A3 participates in the conference 110 of account 2 using the received attendee meeting controls from account 1.

Thus, the method 900 provides a method for operating an attendee device to obtain meeting controls from a server for use during a network conference on a different account. It should be noted that the operations of the method 900 are exemplary and not limiting of the scope of the embodiments. Furthermore the operations of the method 900 can be changed, deleted, rearranged, added to, or otherwise modified within the scope of the embodiments.

Figure 10:
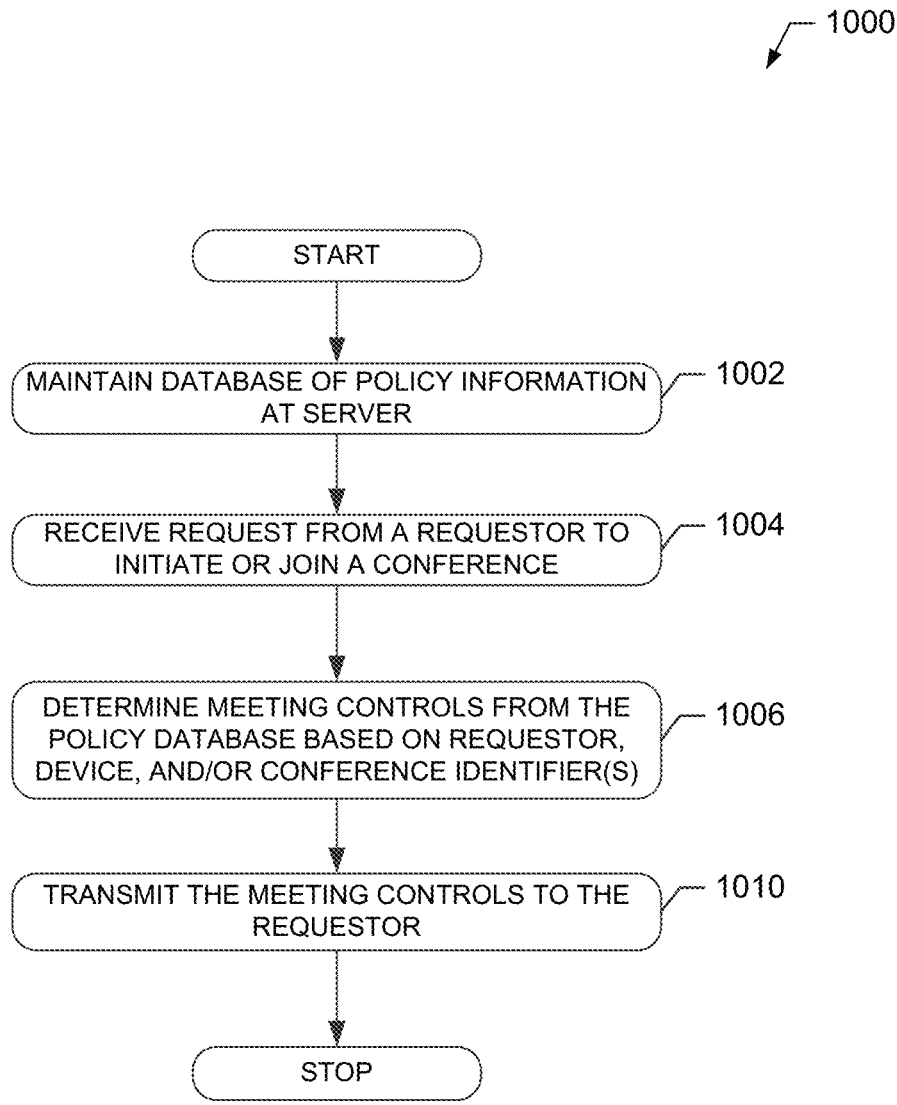
FIG. 10 shows an exemplary method for operating a server to provide network conference meeting controls to a requesting device.

FIG. 10 shows an exemplary method 1000 for operating a server to provide network conference meeting controls to a requesting device. For example, in an embodiment, the method 1000 is performed by the processor 202 of the server 200 executing the policy application 212 as shown in FIG. 2.

At block 1002, a database of policy information is maintained at the server. For example, the policy database 112 is maintained at the server 200 by the processor 202. The database 112 comprises one or more account sections and each account section can include one or more group entries and/or one or more user entries. All users identified under an account section are assigned the same meeting controls. Each group section identifies one or more users that are assigned the same meeting controls. The user entries assign meeting controls to particular users.

At block 1004, a request is received from a requestor to initiate or join a network conference. For example, the request 218 may be received from a host requesting to initiate a conference or the request 220 may be received an attendee requesting to join a conference. The request includes at least one of a requestor, device, and conference identifier.

At block 1006, meeting controls for the requestor are determined from the policy database of based on at least one of the requestor, device, and conference identifier. An exemplary detailed description of this operation is provided with respect to FIG. 11.

At block 1008, the determined meeting controls are transmitted to the requestor. For example, the processor 202 controls the transceiver 206 to transmit the determined meeting controls 216 to the requestor.

Thus, the method 1000 provides a method for operating a server to provide network conference meeting controls to a requesting device. It should be noted that the operations of the method 1000 are exemplary and not limiting of the scope of the embodiments. Furthermore the operations of the method 1000 can be changed, combined, deleted, rearranged, added to, or otherwise modified within the scope of the embodiments.

Figure 11:
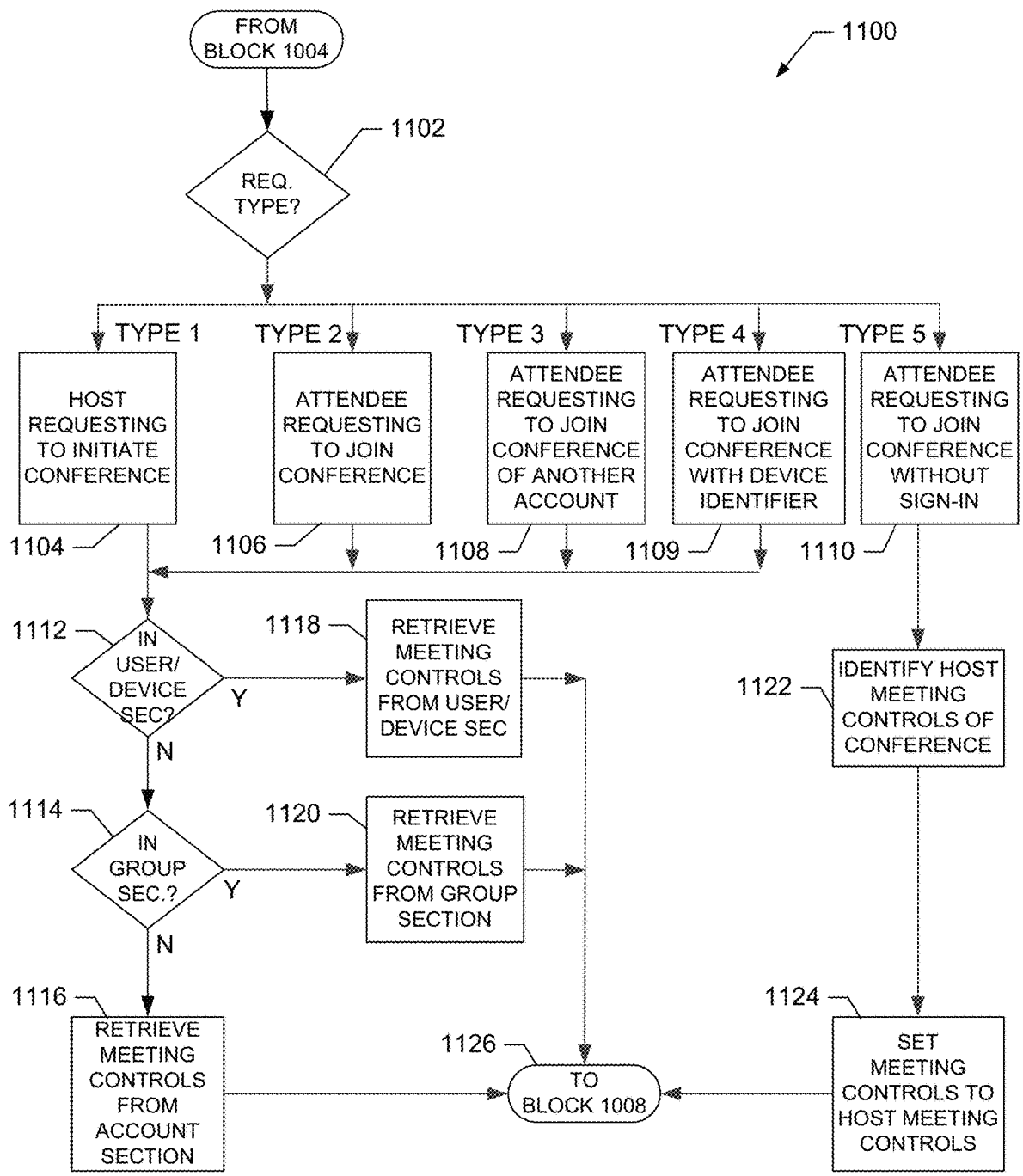
FIG. 11 shows an exemplary method for operating a server to provide network conference meeting controls to a requesting device.

FIG. 11 shows an exemplary method 1100 for operating a server to provide network conference meeting controls to a requesting device. For example, in an embodiment, the method 1100 provides operations performed at block 1006 shown in FIG. 10. For example, in an embodiment, the method 1100 is performed by the processor 202 executing the policy application 212 as shown in FIG. 2.

At block 1102, a determination is made as to the type of request received from the requesting device. In an embodiment, the requesting device provides at least one of a requestor, device, and conference identifier in the request. The request can be one of five types. The method proceeds based on the type of request received.

At block 1104, a first type of request is received from a host device requesting to initiate a network conference. The request includes a user/device identifier for the host requestor. After receiving this request, the method proceeds to block 1112.

At block 1106, a second type of request is received from an attendee device requesting to join a network conference. The request includes a user/device identifier for the attendee requestor. After receiving this request, the method proceeds to block 1112.

At block 1108, a third type of request is received from an attendee requesting to join a network conference associated with an account that is different from the account to which the attendee belongs. The request includes an identifier that identifies the conference to be joined. After receiving this request, the method proceeds to block 1112.

At block 1109, a fourth type of request is received from an attendee that provides a device identifier and requests to join a conference. The request includes a device identifier, such as a device code, IP address, and/or token. Detailed descriptions of the device identifiers are provided with reference to FIGS. 12-13. After receiving this request, the method proceeds to block 1112.

At block 1110, a fifth type of request is received from an attendee requesting to join a network conference without signing-in. The request includes an identifier that identifies the conference to be joined. After receiving this request, the method proceeds to block 1122.

At block 1112, a determination is made as to whether the requestor is in the user section of the policy database or in the device section of the policy database. For example, the processor 202 determines if the requestor identifier is associated with meeting controls in the user section 118 of the policy database 112. If the requestor identifier is found in the user section 118 of the policy database 112, the method proceeds to block 1118. If requestor identifier for the requestor is not found in the user section 118 of the policy database 112, the method proceeds to block 1114.

In another embodiment, the processor 202 determines if a device identifier of the requestor is associated with meeting controls in a device section of a policy database. For example, the database 1206 includes meeting controls associated with device identifiers. A detailed description of the database 1206 is provided with reference to FIG. 13. If the device identifier for the requestor is found in device section 1302 of the policy database 1206, the method proceeds to block 1118. If device identifier for the requestor is not found in the policy database 1206, the method proceeds to block 1114.

At block 1118, meeting controls associated with the user/device identifier are retrieved from the policy database. For example, the processor 202 retrieves the meeting controls associated with the user/device identifier of the requesting device from the user section 118 of the policy database 112 or the device section 1302 of the policy database 1206. The method then proceeds to block 1126.

At block 1114, a determination is made as to whether the requesting device is in the group section of the policy database. For example, the processor 202 determines if the user/device identifier is associated with meeting controls in the group section 116 of the policy database 112. If the identifier for the requesting device is found in the group section 116 of the policy database 112, the method proceeds to block 1120. If identifier for the requesting device is not found in the group section 116 of the policy database 112, the method proceeds to block 1116.

At block 1120, meeting controls associated with the device identifier are retrieved from the policy database. For example, the processor 202 retrieves the meeting controls associated with the user/device identifier of the requesting device from the group section 116 of the policy database 112. The method then proceeds to block 1126.

At block 1116, meeting controls for the requesting device are retrieved from the account section of the policy database. For example, the processor 202 retrieves the meeting controls for the requesting device from the account section 114 of the policy database 112. The method then proceeds to block 1126.

At block 1122, the conference identified in the request from the requestor is used to determine host meeting controls. For example, meeting controls provided to the host of the identified conference are determined as the meeting controls to be used by the requesting device.

For example, the processor 202 uses the received conference identifier in the request to access the policy database 112 to determine the meeting controls assigned to the host of the identified conference. These host meeting controls are assigned to the requesting device. The method then proceeds to block 1124.

At block 1124, the host meeting controls that have been assigned to the requesting device are provided to block 1008 of the method 1000 and are transmitted to the requesting device for use during the network conference.

Thus, the method 1100 provides a method for operating a server to provide network conference meeting controls to a requesting device. It should be noted that the operations of the method 1100 are exemplary and not limiting of the scope of the embodiments. Furthermore the operations of the method 1100 can be changed, deleted, rearranged, added to, or otherwise modified within the scope of the embodiments.

ADDITIONAL EMBODIMENTS

FIG. 12 shows another exemplary embodiment of a communication network 1200 that illustrates how meeting controls are provided to conference participants in accordance with embodiments of the invention. The communication network 1200 comprises a server 1204 that communicates with a communication network 1226 to facilitate network conferences between conference participants. In an embodiment, the communication network 1226 comprises a wired communication network, a wireless communication network, or a combination of wired and wireless communication networks.

In an embodiment, the server 1204 comprises a policy database 1206 that provides meeting controls for use by participants during a network conference. The policy database 1206 includes device identifiers 1228 (1-n) that define user meeting controls for a plurality of devices. In an embodiment, the meeting controls control the ability for a device to perform a variety of functions, such as record a conference, conduct chats, or perform screen sharing during a conference. Virtually any other functions performed by a participant during a conference can be controlled by the meeting controls. The meeting controls can therefore provide network security and privacy and can be implemented using a single policy database.

During operation, the server 1204 executes a policy application 1210. The policy application 1210 receives requests to initiate or join a conference from various devices, such as device 1202. The request includes a device identifier that is used by the policy application 1210 to determine user controls for the requesting device from the policy database

1206. The policy application 1210 then transmits the user controls 1230 to the requesting device. The user controls control the functionality of the requesting device during network conferences. In various embodiments, the PA 1210 determines user controls from the database 1206 using various types of device identifiers that are described in more detail below.

Client Enrollment Code

In an exemplary embodiment, a client application 1208 is installed on the device 1202. During the install process, the PA 1210 transmits an enrollment code ("code") 1212 that is installed on the device 1202. The code 1212 acts as a device identifier and is used to determine user controls for the device 1202 from the policy database 1206. In an embodiment, the enrollment code 1212 is provided to the client application 1208 through any suitable mechanism (MDM, Group Policy, Installer Flags, or in-client entry). Once enrolled, the client 1208 provides the device code with a request 1214 to the server 1204 to download settings from the server periodically and to report back with details of the system. The PA 1210 receives the request and utilizes the code 1212 to access the policy database 1206 to obtain user controls that are transmitted back to the device 1202. This process allows server administrators to see all of the clients deployed within their organization and to enforce policy rules on those clients even if users are not signed into their client applications. Since this required an active action on behalf of the user, or the administrator installing this configuration, these settings would apply universally to the client regardless of connection. Furthermore, user control settings may extend beyond the meeting experience to control general behavior of the client, such as client software upgrades.

IP Address Identifier

In another exemplary embodiment, when the client applications 1208 attempts to contact the server 1204, the communication includes an IP address that is identified as belonging to a given organization through a validation process (for example, IP address reverse look up to an associated domain or an approved IP address list). Thus, the request is associated with either the code 1212 or an IP address (as indicated at 1214). Based on the IP address as a device identifier, the policy application 1210 utilizes this information to access the policy database 1206 to obtain user controls for the requesting device. The determined user controls 1230 are provided to the requesting client. This process allows corporations to maintain control of how clients behave, regardless of login or computer, as long as it's passing data through a corporate network. However, since devices owned by third parties might use this network path, the settings will only be applied at a per-meeting level. Optionally, clients taking this path can be prompted if they want to enroll in management and if the end user agrees, they would then fall into the first category of enrollment code.

INSPECTION AND MODIFICATION

In another exemplary embodiment, when the client application 1208 attempts to contact the server 1204, the communication passes through network equipment 1220 that can inspect or modify the requests. For example, in one embodiment, the network equipment 1220 is a cloud access security broker (CASB). In other embodiment, the network equipment 1220 is a secure web gateway (SWG) or other suitable Proxy. The network equipment 1220 inspects the traffic and adds a specific token 1222 as a device identifier to any request as indicated at 1224. The policy application 1210 utilizes the token to access the policy database 1206 to obtain user controls for the requesting device. The determined user controls 1230 are provided to the requesting client. This process allows corporations to maintain control of how client applications behave, regardless of login or computer, as long as the client is passing data through a corporate network. However, since devices owned by third parties might use this network path, the settings will only be applied at a per-meeting level. Optionally, clients taking this path can be prompted if they want to enroll in management and if the end user agrees they would then fall into the first category of enrollment code.

Thus, in various embodiments, the request is associated with a device identifier that can be an enrollment code, IP address, or token (as indicated at 1224). The PA 1210 utilizes the device identifier to access the policy database 1206 to determine user controls for the requesting device.

FIG. 13 shows a diagram illustrating an exemplary embodiment of a policy database 1300. For example, the policy database 1300 is suitable for use as the policy database 1206 shown in FIG. 12. In an embodiment, the policy database 1300 comprises a plurality of device identifiers 1302 that are associated with user controls 1304 that enable and disable functions for screen share, chat, and recording during a network conference. In various embodiments, the device identifiers can be at least one of an enrollment code, IP address, and token.

FIG. 14 shows an exemplary method 1400 for operating a device to obtain meeting controls from a server for use during a network conference. For example, in an embodiment, the method 1400 is performed by the client application 1208 running on the device 1202 shown in FIG. 12.

At block 1402, a client application is installed on a device. For example, the user of the device 1202 installs the client application 1208. In an embodiment, the as part of the installation, an enrollment code 1212 is also installed on the device 1202. The enrollment code 1212 is provided by the policy application 1210 and can be used to identify specific user controls in the policy database 1206.

At block 1404, the client application transmits a request to the server. For example, the request may be to host or join a network conference. The request includes the enrollment code installed during the client installation. For example, the device transmits the request 1214 with the code to the server 1204. In an embodiment, the request 1214 flows to the server 1204 and the code is used by the policy application 1210 to determine user controls for the device 1202. In another embodiment, the request includes an IP address which flows to the server 1204. The IP address is used by the policy application 1210 to determine user controls for the device 1202. In still another embodiment, the request includes a token 1222 added by the network equipment 1220, indicated at 1224, which flows to the server 1204. The token is used by the policy application 1210 to determine user controls for the device 1202.

At block 1406, in response to the request, the server transmits the determined meeting controls, which are received at the requesting device. For example, the meeting controls 1230 are received by the device 1202 from the server 1204.

At block 1408, the meeting controls are applied at the device. For example, the meeting controls are utilized during a network conference to control the operation of the device 1202.

At block 1410, the device participates in the conference using the received meeting controls. For example, the device 1202 participates in a conference under the control of the received meeting controls.

Thus, the method 1400 provides a method for operating a device to obtain meeting controls from a server for use during a network conference. The device is associated with one or more device identifiers and at least one of the device identifiers is used to obtain device meeting controls from a policy database. It should be noted that the operations of the method 1400 are exemplary and not limiting of the scope of the embodiments. Furthermore the operations of the method 1400 can be changed, deleted, combined, rearranged, added to, or otherwise modified within the scope of the embodiments.

FIG. 15 shows an exemplary method 1500 for operating a server to provide network conference meeting controls to a requesting device. For example, in an embodiment, the method 1500 is performed by the server 1204 executing the policy application 1210 as shown in FIG. 12.

At block 1502, device identifiers (e.g., codes) are provided to installed clients. For example, the code 1212 is provided to the installed client application 1208.

At block 1504, a database of policy information is maintained at the server. For example, the policy database 1206 is maintained at the server 1204. The database 1206 comprises device identifiers 1302 (codes/IP addresses/tokens) that are associated with user controls 1304.

At block 1506, a request is received from a requestor to initiate or join a network conference. The request includes a device identifier. In one embodiment, the device identifier is the enrollment code 1212 that is added to the request by the client application 1208. In another embodiment, the device identifier is an IP address associated with the requesting device. In still another embodiment, the device identifier is a token 1222 that is added to the request by network equipment 1220.

At block 1508, meeting controls for the requestor are determined from the policy database based on the received device identifier. For example, the policy database 1206 is accessed using the device identifier 1302 to determine the meeting controls 1304 for the requestor.

At block 1510, the determined meeting controls are transmitted to the requestor. For example, the user controls 1230 are transmitted from the server 1204 to the device 1202.

Thus, the method 1500 provides a method for operating a server to provide network conference meeting controls to a requesting device based on a device identifier. It should be noted that the operations of the method 1500 are exemplary and not limiting of the scope of the embodiments. Furthermore the operations of the method 1500 can be changed, deleted, combined, rearranged, added to, or otherwise modified within the scope of the embodiments.

An aspect may include a method that includes maintaining a policy database including accounts that each have internal conference controls and external conference controls. The method may include receiving a request from a user device to join a conference, wherein the request includes a first identifier. The method may include transmitting the internal conference controls to the user device when the first identifier and a second identifier are the same.

An aspect may include an apparatus that includes a policy database and a processor. The policy database may include accounts that each have internal conference controls and external conference controls. The processor may be configured to receive a request from a user device to join a conference, wherein the request includes a first identifier. The processor may be configured to transmit the internal conference controls to the user device when the first identifier and the second identifier are the same.

An aspect may include a non-transitory computer-readable medium comprising stored instructions that, when executed by a processor, cause the processor to perform operations. The operations may include maintaining a policy database including accounts that each have internal conference controls and external conference controls. The operations may include receiving a request from a user device to join a conference, wherein the request includes a first identifier. The operations may include transmitting the internal conference controls to the user device when the first identifier and a second identifier are the same.

In one or more aspects, the first identifier may be an IP address. In one or more aspects, the first identifier may be either a user identifier or a device identifier. In one or more aspects, maintaining the policy database may include associating identifiers with meeting controls. In one or more aspects, a matching identifier may be determined from the identifiers that matches the first identifier. In one or more aspects, selected meeting controls associated with the matching identifier may be retrieved. In one or more aspects, the selected meeting controls may be assigned as the meeting controls. In one or more aspects, maintaining the policy database may include associating identifiers with meeting controls, and the policy database may include sections. In one or more aspects, maintaining the policy database may include associating identifiers with meeting controls, and the policy database may include account, group, and user sections. In one or more aspects, the user section may be searched, then the group section may be searched, and then the account section of the policy database may be searched to determine the conference meeting controls. In one or more aspects, it may be determined that the user device has not signed in. In one or more aspects, host meeting controls associated with a host of the conference may be determined. In one or more aspects, the conference meeting controls may be set to the host meeting controls. In one or more aspects, an account section of the policy database may be searched to determine conference meeting controls.

In an embodiment, the exemplary embodiments described herein are implemented using customized hard-wired logic, one or more ASICs or FPGAs, firmware and/or program logic which in combination with a computer system causes or programs the disclosed apparatus to be a special-purpose machine. According to one embodiment, the operations described herein are performed by a processor or computer executing one or more sequences of one or more instructions contained in memory. Such instructions may be read into memory from another storage medium. Execution of the sequences of instructions contained in memory causes a processor to perform the process steps described herein. In alternative embodiments, hard-wired circuitry may be used in place of or in combination with software instructions.

The term "storage media" as used herein refers to any non-transitory medium that stores data and/or instructions that cause a machine to operate in a specific fashion. Such storage media may comprise non-volatile media and/or volatile media. Non-volatile media includes, for example, optical or magnetic disks, such as memory 204 or instruction memory 208. Volatile media includes dynamic memory. Common forms of storage media include, for example, a floppy disk, a flexible disk, a hard disk, a solid state drive, a magnetic tape, or any other magnetic data storage medium, a CD-ROM, any other optical data storage medium, any physical medium with patterns of holes, a RAM, a PROM, and an EPROM, a FLASH-EPROM, an NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise one or more buses. Transmission media can also take the form of acoustic or light waves, such as those generated during radio-wave and infra-red data communications.

Various forms of media may be involved in carrying one or more sequences of one or more instructions to a disclosed processor for execution. For example, the instructions may initially be carried on a magnetic disk or a solid-state drive of a remote computer. The remote computer can load the instructions into its dynamic memory and send the instructions over a telephone line using a modem. A local modem can receive the data on the telephone line and use an infra-red transmitter to convert the data to an infra-red signal. An infra-red detector can receive the data carried in the infra-red signal and appropriate circuitry can place the data on a data bus, which carries the data to a memory, from which a processor retrieves and executes the instructions. The instructions may optionally be stored on a storage device either before or after execution by processor.

The exemplary embodiment of the present invention includes various processing steps described herein. The steps of the embodiment may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

While particular embodiments of the present invention have been shown and described, it will be obvious to those of ordinary skills in the art that based upon the teachings herein, changes and modifications may be made without departing from the exemplary embodiments of the present invention and their broader aspects. Therefore, the appended claims are intended to encompass within their scope all such changes and modifications as are within the true spirit and scope of this exemplary embodiments of the present invention.

What is claimed is:

1. A method, comprising:
   maintaining a policy database including accounts that each have internal conference controls and external conference controls;
   receiving a request from a user device to join a conference, wherein the user device is not signed-in to a user account and the request includes a first identifier;
   transmitting at least a portion of the internal conference controls to the user device when the first identifier, and a second identifier stored in the policy database, match; and
   transmitting at least a portion of the external conference controls to the user device when the first identifier, and the second identifier stored in the policy database, are different.

2. The method of claim 1, further comprising:
   performing the method at a server.

3. The method of claim 1, wherein the first identifier is an internet protocol (IP) address.

4. The method of claim 1, wherein the first identifier is either a user identifier that identifies a user of the user device or a device identifier.

5. The method of claim 1, wherein maintaining the policy database includes associating identifiers with the internal conference controls and the external conference controls.

6. The method of claim 5, further comprising:
   determining a matching identifier from the identifiers that matches the first identifier;
   retrieving selected conference controls associated with the matching identifier; and
   assigning the selected conference controls as the internal conference controls.

7. The method of claim 1, wherein maintaining the policy database includes associating identifiers with meeting controls, and wherein the policy database includes one or more sections.

8. The method of claim 7, wherein the one or more sections includes account sections, group sections, and user sections.

9. The method of claim 8, further comprising:
   searching the user sections, then the group sections, and then the account sections of the policy database to determine the internal conference controls and the external conference controls.

10. The method of claim 1, further comprising:
    determining that the user device has not signed in;
    determining host meeting controls associated with a host of the conference; and
    setting the internal conference controls to the host meeting controls.

11. An apparatus, comprising:
    a policy database that includes accounts that each have internal conference controls and external conference controls; and
    a processor configured to:
    receive a request from a user device to join a conference, wherein the user device is not signed-in to a user account and the request includes a first identifier;
    transmit at least a portion of the internal conference controls to the user device when the first identifier, and a second identifier stored in the policy database, match; and
    transmit at least a portion of the external conference controls to the user device when the first identifier, and the second identifier stored in the policy database, are different.

12. The apparatus of claim 11, wherein the processor is further configured to:
    associate identifiers with the internal conference controls and the external conference controls.

13. The apparatus of claim 11, wherein the policy database includes one or more sections.

14. The apparatus of claim 13, wherein the one or more sections include an account section, a group section, and a user section.

15. The apparatus of claim 14, wherein the processor is further configured to:
    sequentially search the user section of the policy database, the group section of the policy database, and the account section of the policy database to determine conference meeting controls.

16. A non-transitory computer-readable medium comprising stored instructions that, when executed by a processor, cause the processor to perform operations comprising:

maintaining a policy database including accounts that each have internal conference controls and external conference controls;

receiving a request from a user device to join a conference, wherein the user device is not signed-in to a user account and the request includes a first identifier;

transmitting at least a portion of the internal conference controls to the user device when the first identifier, and a second identifier stored in the policy database, match; and transmitting at least a portion of the external conference controls to the user device when the first identifier, and the second identifier stored in the policy database, are different.

17. The non-transitory computer-readable medium of claim 16, wherein the instructions cause the processor to perform operations further comprising:

determining a matching identifier that matches the first identifier;

retrieving selected conference controls associated with the matching identifier; and assigning the selected conference controls as the internal conference controls.

18. The non-transitory computer-readable medium of claim 16, wherein the instructions cause the processor to perform operations further comprising:

searching a user section of the policy database to determine the internal conference controls and the external conference controls.

19. The non-transitory computer-readable medium of claim 16, wherein the instructions cause the processor to perform operations further comprising:

searching a group section of the policy database to determine the internal conference controls and the external conference controls.

20. The non-transitory computer-readable medium of claim 16, wherein the instructions cause the processor to perform operations further comprising:

searching an account section of the policy database to determine the internal conference controls and the external conference controls.

* * * * *